United States Patent [19]
Lukes

[11] Patent Number: 5,746,096
[45] Date of Patent: May 5, 1998

[54] BREAK-OFF DRILLPOINT SCREW

[75] Inventor: Richard Lukes, Calmar, Iowa

[73] Assignee: Textron Inc., Providence, R.I.

[21] Appl. No.: 494,703

[22] Filed: Jun. 26, 1995

[51] Int. Cl.$^6$ .............................. B25B 21/00; F16B 25/00; F16B 31/00
[52] U.S. Cl. .................... 81/54; 411/387; 411/2; 81/180.1
[58] Field of Search .................. 81/54, 180.1; 411/386, 411/387, 2, 3, 5

[56] References Cited

U.S. PATENT DOCUMENTS

| | | | |
|---|---|---|---|
| 2,993,950 | 7/1961 | Forman | 411/387 X |
| 3,812,757 | 5/1974 | Reiland | |
| 4,900,208 | 2/1990 | Kaiser et al. | 411/387 |
| 4,958,973 | 9/1990 | Shinjo | 411/387 |
| 5,199,834 | 4/1993 | Seidl et al. | |

OTHER PUBLICATIONS

*TOR® Drive Systems Solutions* —© Camcar Textron 1990, 12 pages.

*Primary Examiner*—D. S. Meislin
*Attorney, Agent, or Firm*—Trexler, Bushnell, Giangiorgi & Blackstone, Ltd.

[57] ABSTRACT

A fastener, method of fastening, a fastener and drive tool system, and a drive tool for driving a fastener in which the fastener has a leading portion or drill tip portion which is frangible and detachable from the threaded portion. The fastener includes a shank having a head formed at one end, the leading portion or drill tip at an opposite end thereof, and the threaded portion positioned intermediate the head and drill portion. A weakened or frangible portion is provided on the shank between the drill tip and the threaded portion for dividing the fastener into the threaded portion which is retained in engagement with the workpieces and the drill tip which is detached from the fastener. The method includes driving the fastener into a workpiece and detaching or fracturing the drill tip from the threaded portion generally at a predetermined location. The detachment or frangible portion is formed to facilitate fracture at a predetermined area along the shank either manually or automatically as a function of the structure of the fastener and/or the fastener driving process. The present invention also includes the tool included in the fastener system which is used to drive the fastener into a workpiece. The tool includes an interference block having a surface which promotes fracture and detachment of the drill from the threaded portion when the drill portion abuts and is deflected by the surface.

11 Claims, 3 Drawing Sheets

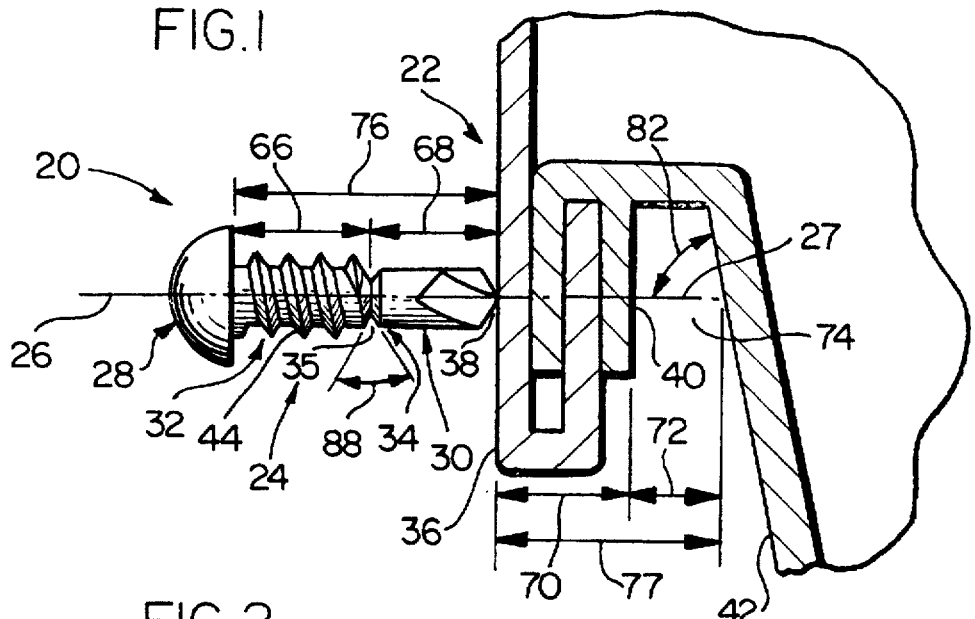
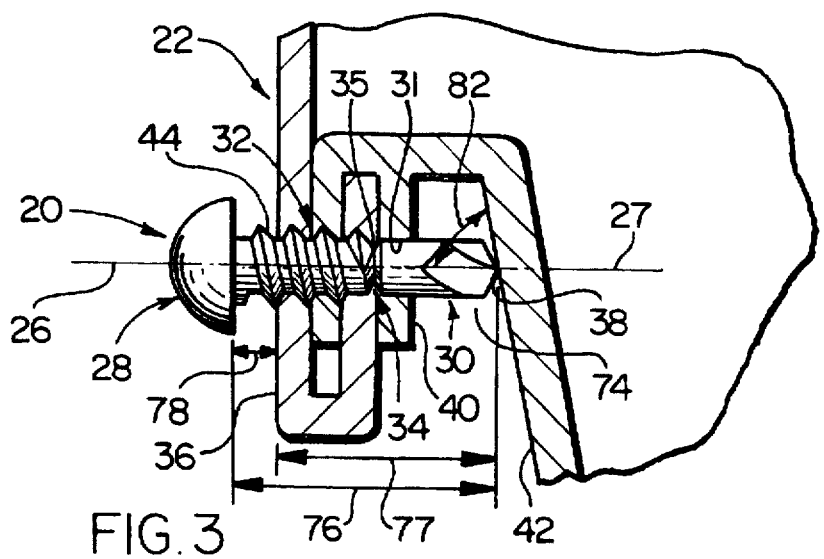
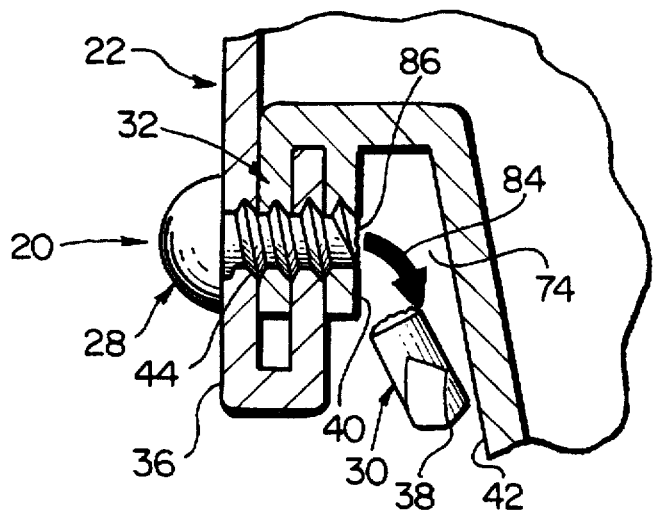

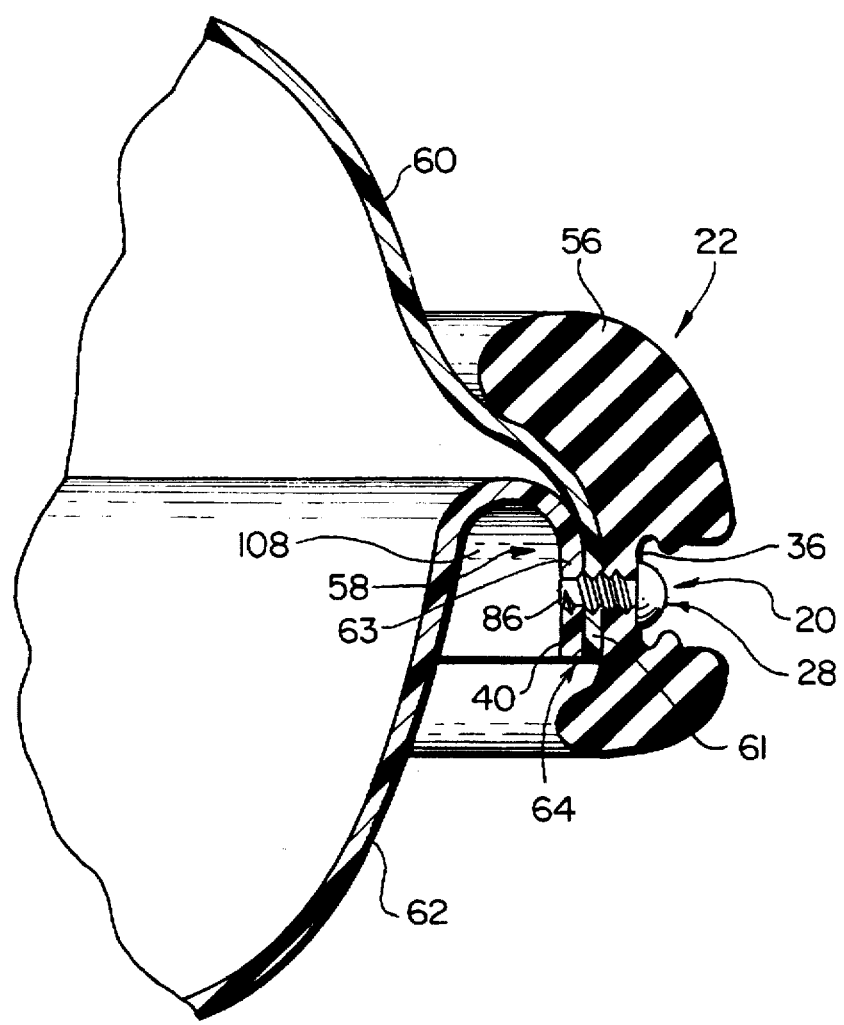
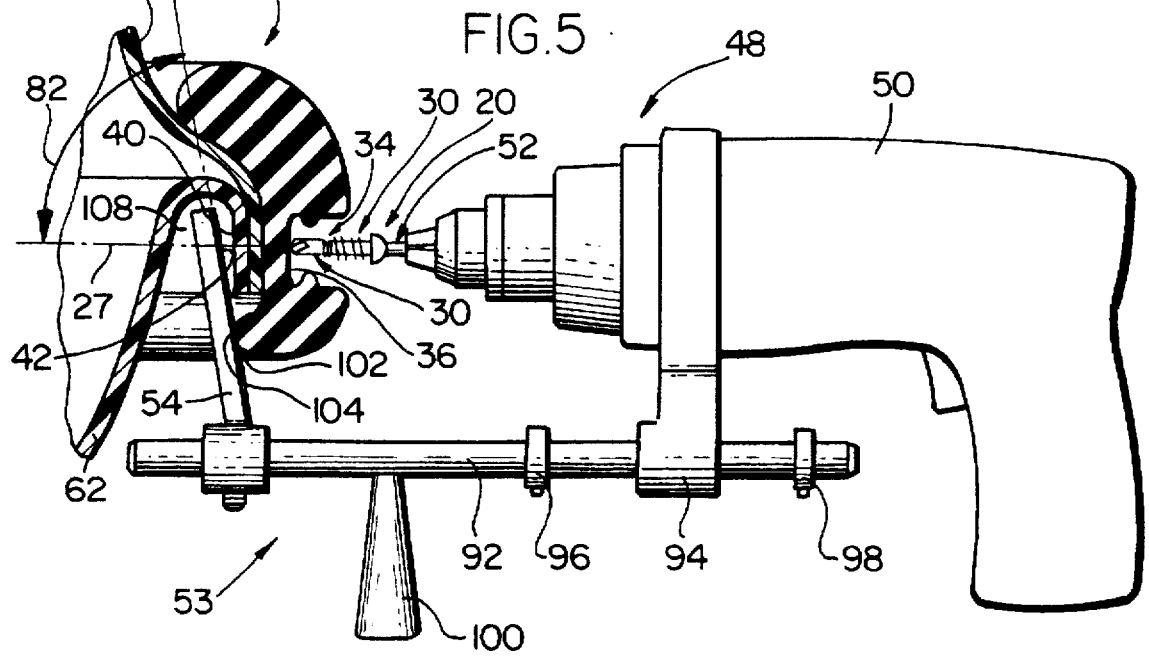

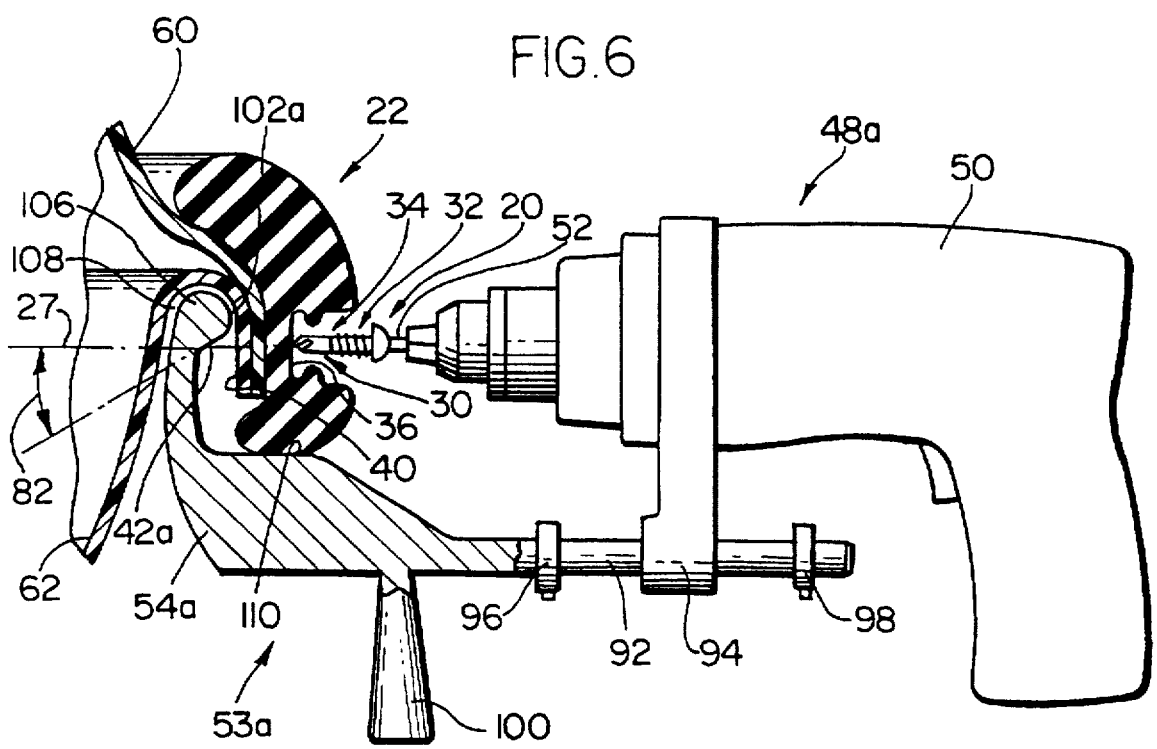
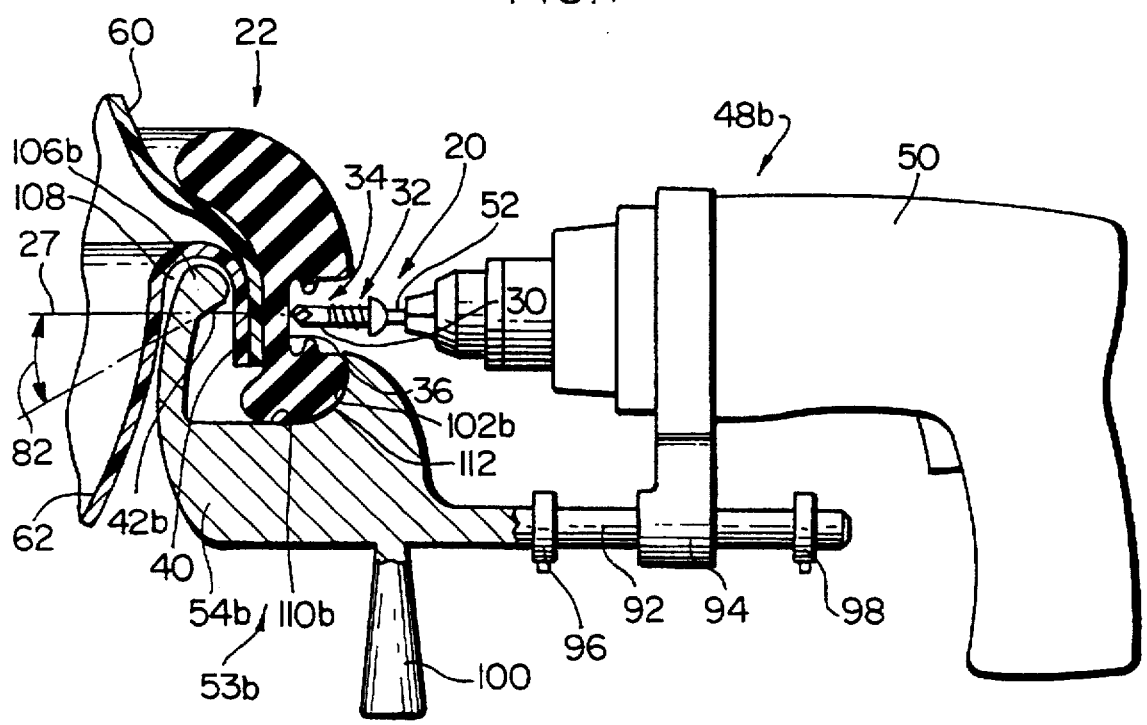

5,746,096

1

BREAK-OFF DRILLPOINT SCREW

BACKGROUND

The present invention relates to self-drilling fasteners having a drill portion which is detachable or frangible from a threaded portion, a method of fastening using a self-drilling fastener of the present invention, and a drive tool for use with a self-drilling fastener of the present invention.

Numerous fasteners are available which provide self-drilling features. In many applications, self-drilling fasteners, such as drill screws, are advantageous as the holes and threads are drilled and formed by the fastener in a single driving application. Self-drilling fasteners eliminate the additional assembly steps of drilling and tapping holes before driving of the fastener. As such, self-drilling fasteners may be highly advantageous by reducing preparation and assembly time, cost and effort.

Self-drilling fasteners are designed with a shank having a head formed at one end, a drill-tip portion at the end opposite the head, and a threaded portion intermediate the drill portion and head. The drill-tip portion is provided with a chisel point and cutting edge which drill into the workpiece material forming a hole for engagement by the threaded portion. The drill portion is sized and dimensioned to provide a hole having a predetermined diameter which provide positive engagement of the thread portion, for cold forming or swaging internal threads thereon.

While self-drilling fasteners of the type briefly described hereinabove have provided many advantages, use of such fasteners in some situations may not provide desirable finished results. For example, in applications where the thickness dimension of the workpiece is less than the total length of the shank of the fastener, the drill-point may protrude from the workpiece. This may be undesirable as it may result in a point extending from a surface or may merely appear to be unfinished or otherwise aesthetically undesirable. Additionally, the drill-point is not required in the workpiece since often it does not include threads and therefore does not provide substantial mechanical advantage or any clamping function in joining the workpieces, as compared to the threaded portion.

OBJECTS AND SUMMARY

A general object satisfied by the invention is to provide a fastener which includes a drill portion or drillpoint which is detachable from the shank of the fastener.

Another object satisfied by the invention may be to provide a method of fastening in which a fastener is driven into a workpiece and the drilling portion is detached from the threaded portion at some point either during or after the fastener is driven into the workpiece.

Briefly, and in accordance with the foregoing, the present invention envisions a fastener, method of fastening, a fastener and drive tool system, and a drive tool for driving a fastener in which the fastener has a leading portion or drill tip portion which is frangible and detachable from the threaded portion. The fastener includes a shank having a head formed at one end, the leading portion or drill tip at an opposite end thereof, and the threaded portion positioned intermediate the head and drill portion. A weakened or frangible portion is provided on the shank between the drill tip and the threaded portion for dividing the fastener into the threaded portion which is retained in engagement with the workpieces and the drill tip which is detached from the fastener. The method includes driving the fastener into a

2 workpiece and detaching or fracturing the drill tip from the threaded portion generally at a predetermined location. The detachment or frangible portion is formed to facilitate fracture at a predetermined area along the shank either manually or automatically as a function of the structure of the fastener and/or the fastener driving process. The present invention also includes the tool included in the fastener system which is used to drive the fastener into a workpiece. The tool includes an interference block having a surface which promotes fracture and detachment of the drill from the threaded portion when the drill portion abuts and is deflected by the surface.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 1 is an enlarged, partial fragmentary, cross-sectional, side elevational view of a fastener of the present invention positioned for insertion into a joint formed by two workpieces;

FIG. 2 is an enlarged, partial fragmentary, cross-sectional, side elevational view of the fastener inserted into but not fully driven into and seated in the workpieces;

FIG. 3 is an enlarged, partial fragmentary, cross-sectional, side elevational view in which the fastener is completely driven into and seated in the workpieces and a leading portion of the fastener has been fractured and detached from a portion which is retained in the workpieces;

FIG. 4 is a partial fragmentary, cross-sectional, side elevational view of a fastener of the present invention employed in a use to attach a molding strip to a body portion having two flanges forming an overlapping joint;

FIG. 5 is a partial fragmentary, cross-sectional, side elevational view of the workpiece as shown in FIG. 4 further including a tool and interference assembly which facilitates driving of the fastener into the workpiece and detachment of the leading portion from the trailing portion;

FIG. 6 is a partial fragmentary, cross-sectional, side elevational view similar to that as shown in FIG. 5 and further illustrating an alternate embodiment of the interference assembly; and FIG. 7 is a partial fragmentary, cross-sectional, side elevational view similar to that as shown in FIGS. 5 and 6 illustrating a second alternate embodiment of the interference assembly.

DESCRIPTION

While the present invention may be susceptible to embodiment in different forms, there is shown in the drawings, and herein will be described in detail, preferred embodiments with the understanding that the present description is to be considered an exemplification of the principles of the invention and is not intended to limit the invention to those as illustrated and described herein.

FIGS. 1-3 provide a generalized, diagrammatic, illustration of a fastener 20 of the present invention for use in attachment to workpieces 22. As shown, the fastener 20 includes a shank 24 defining a central axis 26 and a path of travel 27. A drive head 28 is formed on one end of the shank 24 and a leading portion in the form of a drill-point portion 30 is formed on an end of the shank 24 opposite the drive head 28. The drill-point portion 30 drills a hole 31 in the workpieces 22 when the fastener 20 is driven into the workpieces 22. An intermediate portion or threaded portion 32 is formed on the shank 24 positioned between the drive head 28 and the drill-point portion 30. A detachment or frangible portion 34 is shown in the illustrations as including an annular groove or notch 35 is formed in the shank 24 between the threaded portion 32 and the drill-point portion 30. The detachment portion 34 facilitates the fracturing and separation of the drill portion 30 from the threaded portion 32 when the threaded portion 32 is engaged in hole 31 formed by the drill-point portion 30 and the drill point portion engages the opposed wall, FIGS. 2 and 3, which will fracture the frangible portion 34.

FIGS. 1–3 provide a series of progressions which show the fastener 20 being installed in the workpieces 22 and ultimately in which the drill-point portion 30 is detached or separated from the fastener 20. Generally, in the method of the present invention, the drill-point portion 30 of the fastener 20 is driven into a first side 36 of the workpiece 22 (see FIG. 1) to form the aperture 31. Driving of the fastener is continued with the threaded portion 32 engaging the workpiece 22. Continued driving results in a tip or point portion 38 of the drill-point portion 30 exiting a second side 40 of the workpieces 22. A third or opposed surface 42 is positioned proximate the second side 40 so that the tip 38 will contact the third surface 42 at a severe angle, but does not bore or form a hole therein. As threads 44 are advanced through the hole 31 formed by the drilling portion 30 (see FIG. 2), the tip 38 will engage and be deflected by the third surface 42 resulting in the fracturing of the shank 24 at the detachment or frangible portion 34. Breaking of the shank 24 allows the drill-point portion 30 to fall away from and be removed from the fastener 20 after the fastener 20 is installed, FIG. 4.

The present invention also anticipates a drive tool assembly 48 which is used to drive the fastener 20 of the present invention and effect fracturing of the drill point, when it is not practical to rely upon an opposed surface, such as surface 42 to deflect and fracture the drill point. The surface 42 is angled relative to the path of travel of the fastener and may be angled in one of many orientations. In other words, the angle of taper or deflection is sufficient to prevent engagement of the drill-point in the surface 42 and thus promotes the deflection and fracturing of the drill-point portion from the threaded portion.

The drive tool assembly 48 as shown in FIG. 5 with alternate embodiments being shown in FIG. 6 (see drive tool 48a) and in FIG. 7 (see drive tool 48b). It should be noted, that in the alternate embodiments, features or elements which are identical to those as shown in the embodiment illustrated in FIG. 5 will be represented with the same reference number and variations of the embodiment will be represented by the same reference numeral with an alphabetic suffix. For example, the drive tool assembly 48 in FIG. 5 is identified in FIG. 6 by reference numeral 48a and in FIG. 7 by reference numeral 48b.

Returning to FIG. 5, the drive tool assembly 48 includes a drive mechanism 50 for producing driving forces for driving the fastener into the first side 36 of the workpiece 22. In the illustrated embodiment, the drive mechanism is in the form of a standard hand held rotary drill. An engagement tool in the form of a bit 52 is coupled to the drive mechanism 50 and is engageable with the fastener 20 for transferring driving forces from the driving mechanism 50 to the fastener 20. An interference assembly 53 including an interference block 54 is affixed to and depends from the driving mechanism 50. The interference block includes a surface portion that equals the third surface 42 discussed above, against which the fastener is driven to cause the shank 24 to fracture and break at the detachment portion 34 to separate the drill-point portion 30. The third surface 42 of the interference block 54 is positioned near the second side 40 at a predetermined distance to promote detachment of the drill-point portion 30 from the fastener 20.

Having now briefly described the overall structure of the fastener 20 and drive tool assembly 48 as well as the method of the present invention, we shall now turn to a more detailed description in order to more fully define the scope of the present invention. As shown in FIG. 4, the fastener 20 has been installed in a workpiece 22 to attach a piece of molding or trim material 56 to a body portion 58. The body portion 58 includes an upper wall 60 having a flange 61 and a lower wall 62 having a flange 63 which are joined by the fastener 20 in an overlapping area 64. The fastener 20 of the present invention is useful in this application since only a limited length of shank 24 having threads is required in order to attach the trim 56 and to join the upper and lower walls 60, 62. Also, it is advantageous to use the self-drilling type fastener 20 of the present invention to expedite this assembly and minimize the assembly production cost. However, before the present invention, the leading or drill-point portion 30 would remain and would extend from the second side 40.

As shown in FIGS. 1–3, the threaded portion 32 has a length dimension 66 and the drill-point portion 30 has a length dimension 68. The threaded portion dimension 66 generally corresponds to a workpiece thickness 70 and the drill-point portion dimension 68 is generally less than a gap dimension 72 measured between the second side 40 and the third surface 42 which generally define a gap 74 therebetween. It should be noted when making the measurements of the workpiece and third surface 42, the measurement of the third surface 42 is taken along the central axis 26 of the fastener 20 or the path 27 which the fastener travels when the tip 38 contacts the third surface. Considering the foregoing dimensions, a total length 76 of the shank 24 of the fastener 20 is generally less than an overall dimension 77 of the workpieces 22 measured between the first side 36 and the third surface 42. A differential dimension 78 between the overall dimension 77 and the total shank dimension 76 aids in the deflection of the drill-point portion 30 relative to the third surface 42. As shown in the drawings, it is beneficial to have the third surface 42 disposed at a severe angle 82 relative to the path 27 of the fastener 20. The angle 82 of the third surface 42 serves to prevent engagement of the drill portion 30 with the third surface 42 thereby promoting deflection, fracturing and breaking of the shank 24 at the detachment portion 34, without the drill-point 30 drilling a hole in surface 42.

As shown in FIG. 2, as the fastener 20 is driven into the workpiece 22, the drill-point portion 30 will emerge from the second side 40 with the tip 38 eventually contacting the third surface 42. When the tip 38 contacts the third surface 42, the threads 44 have engaged the material of the workpiece 22 in the hole 31 formed by the drill-point portion 30. The threads 44 provide mechanical advantage to continue to urge the fastener 20 along the path 27 as the fastener 20 is rotated by the driving mechanism 50. The mechanical advantage provided by the threads 44 forces the drill-point portion 30 against the third surface 42. Since the tip 38 does not engage the third surface 42, it is deflected or driven away from the path 27 (as shown by arrow 84 in FIG. 3).

The deflection (84) of the drill-point portion 30 imposes stress upon the shank 24. Since the detachment or frangible portion 34 is formed with the notch 35 the stress is concentrated at the detachment portion 34 which promotes the fracturing and breaking of the shank 24. Continued driving separates the shank 24 at the notch 35 with the thread portion 32 being retained in the workpieces 22 to achieve its joining or fastening function. It is desirable to form the thread portion 32 with the dimension 66 generally equal to the thickness 70 of the workpiece 22 as this will result in the shank 24 breaking generally flush with the second side 40 of the workpieces 22. The differential dimension 78 (see FIG. 2) is calculated generally be as the smallest dimension which minimizes the length of the drill-point portion and which promotes fracturing of the shank 24 at the notch 35.

Further considering the notch 35, the notch as shown is an annual groove formed around the outside surface of the fastener shank 24 in a plane generally perpendicular to the central axis 26. The notch 35 can be formed at one of many stages of the manufacturing of the fastener 20 and is formed with a notch angle 88 of generally 45 degrees. It is envisioned that other angles may be used to provide particular advantages depending on the type of material used to form the fastener, the type of material into which the fastener is installed, the type of material and angle at which the third surface 42 is disposed, the type of drive tool assembly 48 and forces applied by such mechanism to the fastener 20, as well as many other factors. It is also understood that the detachment or frangible portion 34 may be provided in other configurations such as dimples, surface working without substantial deformation, as well as any other operation on the detachment portion 34 which promotes weakening of the shank 24 so as to produce the breaking function as described hereinabove. Additionally, the fastener is formed so that the detachment portion 34 does not result in separation of the drill-point portion 30 from the threaded portion 32 merely as a result of the driving torque on the fastener created by the drive mechanism 50. In this regard, it is primarily the self-deflection (84) in combination with the rotary forces or torque applied by the drive mechanism to the fastener which promotes the breaking and detachment of the drill-point portion 30.

The drive tool assembly 48 as shown in FIG. 5 and discussed briefly above includes the interference assembly 53 having an interference block providing a third surface 42 positioned proximate to the second side 40. The third surface 42 is positioned at an angle 82 to promote deflection of the drill portion and the breaking of the shank 24 as described hereinabove. In the embodiment as shown in FIG. 5, the interference assembly 53 includes the interference block 54 removably attached to a shaft 92 which is also attached to a collar 94 retained on the drive mechanism 50. The collar 94 is arranged to move axially along the shaft 92 thereby allowing the drive mechanism 50 to move toward and away from the workpiece 22. Forward and rear stops 96, 98 are attached to the shaft 92 to limit the range of the travel of the collar 94 along the shaft 92 thereby limiting the depth of insertion of fastener 20 into the workpiece 22 and also retaining the shaft 92 in the collar 94. A handle 100 is provided on the shaft 92 to allow an operator to drive the drive mechanism 50 and position the interference block 54 relative to the workpiece. It should be noted that the arrangement as shown block 54 will deflect the drill-point 30 upwardly. The orientation of the block 54 may be reversed on shaft 92 so that the surface 42' (opposite surface 42) is engaged by the fastener, which will deflect the drill-point 30 downwardly, in a manner similar to the embodiment of FIGS. 6 and 7.

As shown in FIG. 5, a first positioning structure 102 is provided on the third surface 42. The first positioning structure 102 abuts a surface of the workpiece 22, in this case an opposing surface 104 of the trim 56. In this arrangement, the dimension between the second side 40 and third surface 42 is sufficient to promote fracturing and breaking of the shank 24 at the detachment portion 34. The second and third embodiments of the interference block 54a, 54b operate in a similar manner.

As shown in FIG. 6, a first positioning structure 102a is provided on the interference block 54a. The first positioning structure 102a is a protruding knob 106 formed on an uppermost portion of the interference block 54a. This protruding knob 106 fits into a recess 108 defined between the lower wall 62 and the corresponding flange 63. The protrusion 106 horizontally positions the third surface 42a of the interference block 54a in an appropriate position along the fastener travel path 27. A second positioning surface 110 is provided to vertically position the third surface 42a in the appropriate position. As such, when an operator is using the embodiment as shown in FIG. 6, the interference block 54a is positioned in the recess 108 to provide positive fail safe positioning of the third surface 42a assuring a desired position to promote detachment of the drill portion 30.

In a similar manner, FIG. 7 provides a first positioning structure 102b and a second positioning structure 110b which horizontally and vertically position the third surface 42b in an appropriate location in the fastener path 27. This third embodiment locates a desired horizontal position by positioning the first positioning structure 102b against an outside surface 112 of the workpiece 22. The second positioning structure 110b operates in a similar manner to the corresponding structure in the second embodiment (FIG. 6) to provide positive vertical location of the third surface 42b.

The fastener 20, drive tool assembly 48, the system of the fastener and drive tool assembly 20, 48, and the method of the present invention promote the attachment of a self-drilling fastener 20 to workpieces 22 and the detachment of the drill-point portion 30 from the fastener 20 as the fastener 20 is seated in the workpiece. In use, the fastener 20 is positioned against the first side 36 of the workpiece 22 whereupon the drive tool assembly 48 operates to rotate the fastener 20 thereby engaging the tip 38 with the first side 36 of the workpiece 22. The fastener 20 of the present invention is illustrated as drill point type fastener with a chisel point tip 38 which acts to drill the hole 31 through the workpiece 22. Next, the threaded portion 32 engages the inside surface of the hole 31 and forms threads therein for secure engagement in the workpiece 22. During the insertion operation the tip 38 contacts the third surface 42. At this point, the drill-point portion 30 is deflected (84) away from the central axis 26 promoting fracturing and breaking of the shank 24 at the notch 36 in the detachment portion 34. Continued driving of the threads 44 through the workpieces 22 increases the point interference of the point 38 against the third surface 42 and the fracturing results in breaking of the shank 24.

It should be noted that the drive tool 50 as shown in the illustrations may take the form of a variety of drive tools. For example, the drive tool assembly 48 may be embodied in a rotary drill to which the collar 94 of the interference assembly 53 is attached as well as a fastener gun which allows for rapid, generally automatic, semi-continuous insertion of fasteners. In such a fastener gun, the fasteners may be served automatically to the engagement head 52. Additionally, although the above description discusses the automatic detachment or breaking of the drill-point portion 30 from the shank 24, it should be understood that the drill-point portion may be manually removed from the shank 24 if necessary.

While preferred embodiments of the present invention are shown and described, it is envisioned that those skilled in the art may devise various modifications and equivalents without departing from the spirit and scope of the appended claims.

The invention claimed is:

1. A method of fastening a fastener to a workpiece, said workpiece having a first side and a second side, said fastener including a shank defining a central axis, a drive head formed on one end of said shank, a drill-point portion located on said shank generally opposite said head, a threaded portion located on said shank between said head and said drill-point portion and a frangible detachment portion formed an external surface of said shank between said drill-point portion and said threaded portion, said method comprising the steps of:

driving said fastener to drive said drill-point portion into said first side of said workpiece;

driving said fastener into said workpiece with said threaded portion engaging said workpiece until at least a tip of said drill-point portion exits said second side of said workpiece and at least partially extends toward a third surface proximate to said second side;

placing an interference block proximate to said second surface, said interference block providing said third surface along a driving path of said fastener for creating a point interference with said tip of said drill-point portion to fracture said detachment portion and facilitate the division of said drill-point portion from said threaded portion; and continuing to drive said fastener until said tip of said drill-point portion contacts said third surface positioned proximate to said second side causing said drill-point portion to detach from said threaded portion at said frangible detachment portion.

2. A method of fastening as recited in claim 1, said third surface on said interference block being sloped and oriented generally facing said second surface, said method further comprising the step of driving said drill-point portion against said sloped third surface for promoting the fracturing of said fastener at said detachment portion to divide said drill-point portion from said threaded portion.

3. A method of fastening a fastener to a workpiece, said workpiece having a first side and a second side, said fastener including a shank defining a central axis, a drive head formed on one end of said shank, a drill-point portion located on said shank generally opposite said head, a threaded portion located on said shank between said head and said drill-point portion, and a frangible detachment portion formed an external surface of said shank between said drill-point portion and said threaded portion, said detachment portion further comprising a recess formed in said shank between said drill-point portion and said threaded portion, said method comprising driving said fastener to drive said drill-point portion into said first side of said workpiece;

driving said fastener into said workpiece with said threaded portion engaging said workpiece until at least a tip of said drill-point portion exits said second side of said workpiece and at least partially extends toward a third surface proximate to said second side; and continuing to drive said fastener until said tip of said drill-point contacts said third surface positioned proximate to said second side causing said drill-point portion to detach from said threaded portion at said frangible detachment portion.

4. A method of fastening as recited in claim 3, said recess comprising an annular groove formed in an outside surface of said shank between said drillpoint portion and said threaded portion oriented in a plane generally perpendicular to said central axis.

5. A fastener and drive tool system for driving said fastener into a workpiece having a first surface and a second surface, said fastener having a shank and a drive head formed on one end of said shank;

said drive tool having a drive mechanism for producing driving forces for driving said fastener into said first side of said workpiece, an engagement bead coupled to said drive mechanism for engaging said drive head on said shank of said fastener, and an interference assembly depending from said drive mechanism, said interference assembly providing a third surface positioned proximate to said second side of said workpiece; and said shank of said fastener defining a central axis, a drill-point portion located on said shank generally opposite said drive head, a threaded portion located on said shank between said drive head and said drill-point portion, and a detachment portion formed in said shank between said drill-point portion and said threaded portion, said drill-point portion of said fastener contacting said third surface and driving thereagainst to promote detachment of said drill-point portion from said threaded portion.

6. A drive tool for driving a fastener into a workpiece having a first side and a second side; said fastener having a shank defining a central axis, a drive head formed on one end of said shank, a drill-point portion located on said shank generally opposite said head, and engaging portion located on said shank between said head and said drill-point portion, and a detachment portion formed in said shank between said drill-point portion and said engaging portion; said drive tool comprising:

a drive mechanism for producing driving forces for driving said fastener into said first side of said workpiece;

an engagement head coupled to said drive mechanism for engaging said drive head on said shank of said fastener and transferring driving forces from said drive mechanism to said fastener; and an interference block assembly depending from said drive mechanism, said interference block assembly having a third surface positioned proximate to said second side of said workpiece, said drill-point portion of said fastener contacting said third surface and driving thereagainst to promote detachment of said drill-point portion from said engaging portion.

7. A drive tool as recited in claim 6, said third surface defining an angle relative to said central axis of said fastener when said fastener is driven into said workpiece.

8. A drive tool as recited in claim 7, said interference block assembly further comprising a first positioning structure providing a first predetermined reference for positioning said tool relative to said workpiece.

9. A drive tool as recited in claim 8, further comprising a second positioning structure providing a second predetermined reference for positioning said tool relative to said workpiece.

10. A drive tool as recited in claim 7, said interference block assembly further comprising a horizontal positioning structure and a vertical positioning structure for providing a predetermined horizontal and vertical positioning reference for positioning said tool and said fastener driven thereby relative to said workpiece.

11. A drive tool as recited in claim 7, wherein said fastener is threaded and said drive mechanism provides rotary driving forces which are transferred to said fastener for threadedly engaging said fastener in said workpiece.

* * * * *

UNITED STATES PATENT AND TRADEMARK OFFICE
CERTIFICATE OF CORRECTION

PATENT NO. : 5,746,096
DATED : May 5, 1998
INVENTOR(S) : Richard Lukes

It is certified that error appears in the above-indentified patent and that said Letters Patent is hereby corrected as shown below:

Title page, item
[56]                   References Cited
"4,958,973   9/1990    Shinjo"     should be -- 4,958,972 9/ 1990 Shinjo --

Column 7, Line 53 "comprising" should be -- comprising the steps of: --

Signed and Sealed this

Twenty-second Day of September, 1998

Attest:

BRUCE LEHMAN

Attesting Officer         Commissioner of Patents and Trademarks